United States Patent
Diehl et al.

(10) Patent No.: US 11,539,256 B2
(45) Date of Patent: Dec. 27, 2022

(54) STATOR HAVING WINDING COOLING FOR AN ELECTRICAL MACHINE

(71) Applicant: Siemens Aktiengesellschaft, Munich (DE)

(72) Inventors: Dirk Diehl, Bubenreuth (DE); Markus Klöpzig, Ebermannstadt (DE); Heinz Schmidt, Möhrendorf (DE); Andreas Schröter, Heroldsbach (DE); Aristide Spagnolo, Erlangen (DE); Markus Wilke, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 289 days.

(21) Appl. No.: 16/494,110

(22) PCT Filed: Mar. 16, 2018

(86) PCT No.: PCT/EP2018/056728
§ 371 (c)(1),
(2) Date: Sep. 13, 2019

(87) PCT Pub. No.: WO2018/167294
PCT Pub. Date: Sep. 20, 2018

(65) Prior Publication Data
US 2021/0328472 A1  Oct. 21, 2021

(30) Foreign Application Priority Data
Mar. 17, 2017  (DE) .................. 10 2017 204 472.1

(51) Int. Cl.
*H02K 3/24*  (2006.01)
*H02K 3/22*  (2006.01)
(Continued)

(52) U.S. Cl.
CPC ............. *H02K 3/24* (2013.01); *H02K 3/22* (2013.01); *H02K 3/28* (2013.01); *H02K 9/197* (2013.01)

(58) Field of Classification Search
CPC .. H02K 3/24; H02K 3/28; H02K 3/22; H02K 9/197
(Continued)

(56) References Cited

U.S. PATENT DOCUMENTS

| 1,448,700 A | 3/1923 | Seidner ........................... 310/54 |
| 4,375,823 A | 3/1983 | Zerlik ............................ 137/340 |

(Continued)

FOREIGN PATENT DOCUMENTS

| DE | 19 13 219 A1 | 9/1970 | ............... H02K 3/22 |
| DE | 100 44 938 A1 | 8/2001 | ............... H02K 9/19 |

(Continued)

OTHER PUBLICATIONS

European Office Action, Application No. 18714183.3, 5 pages, dated Oct. 29, 2020.
(Continued)

*Primary Examiner* — Ahmed Elnakib
(74) *Attorney, Agent, or Firm* — Slayden Grubert Beard PLLC

(57) ABSTRACT

Various embodiments include stator for an electrical machine comprising: a stator winding; and a yoke with a plurality of slots. There are a plurality of conductor segments connected to one another, wherein each conductor segment has one respective axially internal inner section and two respective axially external outer sections. The respective inner section of each conductor segment is embedded into a respective slot. Ducts for coolant flow in the axial direction are formed at least in a portion of each of the slots. The stator defines, at least in a first axial end region, a first (Continued)

coolant chamber fluidically encapsulated from a surrounding area. The first coolant chamber surrounds at least a portion of the respective outer sections of each of the conductor segments situated in the first axial end region. The first coolant chamber is fluidically connected to the ducts to conduct coolant into and/or out of the ducts.

15 Claims, 9 Drawing Sheets

(51) Int. Cl.
    *H02K 3/28*       (2006.01)
    *H02K 9/197*     (2006.01)

(58) Field of Classification Search
    USPC .................................................. 310/54, 201
    See application file for complete search history.

(56) References Cited

U.S. PATENT DOCUMENTS

| | | | | |
|---|---|---|---|---|
| 5,081,382 | A | 1/1992 | Collings | 310/54 |
| 5,965,965 | A * | 10/1999 | Umeda | H02K 3/12 |
| | | | | 310/201 |
| 6,784,573 | B1 * | 8/2004 | Iversen | B23K 33/00 |
| | | | | 310/260 |
| 7,498,711 | B2 * | 3/2009 | Biais | H02K 5/128 |
| | | | | 310/214 |
| 2002/0074871 | A1 | 6/2002 | Kikuchi | 310/58 |
| 2002/0153784 | A1 | 10/2002 | Kanppenberger | 310/52 |
| 2002/0180284 | A1 * | 12/2002 | LeFlem | H02K 9/197 |
| | | | | 310/52 |
| 2003/0001441 | A1 | 1/2003 | Peterson | 310/59 |
| 2007/0176499 | A1 * | 8/2007 | Holmes | H02K 3/24 |
| | | | | 310/58 |
| 2007/0200441 | A1 * | 8/2007 | El-Antably | H02K 9/19 |
| | | | | 310/58 |
| 2008/0136271 | A1 * | 6/2008 | Alfermann | H02K 3/24 |
| | | | | 310/59 |
| 2016/0211721 | A1 | 7/2016 | Garmon et al. | 310/54 |

FOREIGN PATENT DOCUMENTS

| | | | | |
|---|---|---|---|---|
| DE | 10 2004 013 721 A1 | 10/2005 | ............ | H02K 9/19 |
| EP | 0543280 A2 | 5/1993 | ............ | H02K 3/487 |
| EP | 1 215 800 A2 | 6/2002 | ............ | H02K 3/487 |
| WO | 2007/040384 A1 | 4/2007 | ............ | H02K 3/24 |

OTHER PUBLICATIONS

Search Report for International Application No. PCT/EP2018/056728, 12 pages, dated Jun. 13, 2018.
Search Report for DE Application No. 10 2017 204 472.1, 8 pages, dated Feb. 20, 2018.
European Office Action, Application No. 18714183.3, 8 pages, dated Feb. 8, 2022.

* cited by examiner

STATOR HAVING WINDING COOLING FOR AN ELECTRICAL MACHINE

CROSS-REFERENCE TO RELATED APPLICATIONS

This application is a U.S. National Stage Application of International Application No. PCT/EP2018/056728 filed Mar. 16, 2018, which designates the United States of America, and claims priority to DE Application No. 10 2017 204 472.1 filed Mar. 17, 2017, the contents of which are hereby incorporated by reference in their entirety.

TECHNICAL FIELD

The present disclosure relates to electrical machines. Various embodiments may include stators for an electrical machine and/or electrical machines comprising a stator.

BACKGROUND

In known stators for electrical machines, in particular those with high power densities, measures have to be taken in order to effectively dissipate the lost heat released into the stator windings and to avoid overheating of the windings in this way. Here, a large portion of the lost heat is generated as Joule heat due to the current flow in the conductor segments of the stator winding. In order to dissipate this lost current heat of the stator windings, the stator windings are usually indirectly coupled to a cooling system. In other words, the winding is cooled by way of the winding being indirectly coupled to a coolant by other elements of the stator, in particular the stator yoke and/or a conductor insulation and/or a housing wall of the machine. The coolant may be, for example, cooling water or a cooling oil. For example, machines are known in which cooling ducts for so-called water jacket cooling are made in the machine housing. As an alternative, cooling fins for air cooling can also be provided in the machine housing. A fundamental disadvantage of the indirect dissipation of heat is that, owing to the indirect thermal coupling between the stator winding and the coolant, there is a relatively high temperature gradient between the individual components and that, accordingly, the winding temperature is comparatively high in spite of the cooling.

In addition to the described cooling options via the machine housing, further cooling options, in which the heat is dissipated further inside within the machine, are known primarily for very powerful machines. For example, a coolant can be in even closer thermal contact with the stator winding to be cooled by means of spray oil cooling, thermosiphon cooling and/or a heat pipe within the machine. However, here too, the coolant is typically not in direct contact with the electrical conductor, but rather only indirectly in contact via the conductor insulation and/or the stator yoke. Therefore, although the present temperature gradient is lower than in the case of indirect housing cooling, there is still a risk of the winding overheating in the case of high power densities.

In contrast to the described variants with indirect winding cooling, some systems arrange conductor segments of the stator winding in direct contact with a coolant in order to be able to thereby directly draw heat from said conductor segments. To this end, for example, the conductor used for the stator winding can be embodied, at least in sections, as a hollow conductor in order to be able to guide coolant into its interior, as a result of which the conductor can come into direct contact with the coolant without additional thermal coupling elements. In the case of a solution of this kind, the lost heat from the winding is dissipated directly where it is produced.

However, it is technically difficult here to electrically and fluidically couple these hollow conductor coils since the individual winding segments firstly have to be connected to an outer electrical circuit by electrical contacts and since secondly the individual turns, usually separately from one another, have to be connected to inflows and outflows of an outer coolant circuit. In particular, this has to be done such that electrical short circuits by the coolant between turns which are at different electrical potentials are avoided. To this end, it is usually necessary to separately connect the individual turns to supply lines and discharge lines for the coolant. This creates a high level of outlay on equipment for connecting the individual lines.

SUMMARY

The teaching of the present disclosure describe stators comprising a stator winding, which stator overcomes said disadvantages. For example, some embodiments include a stator comprising a stator winding which can be cooled by a coolant as effectively as possible and with as little outlay on equipment as possible. For example, some embodiments comprise a stator (3) for an electrical machine (1) with a central axis (A), comprising: a stator winding (4) and a stator yoke (5) with a plurality of slots, wherein the stator winding (4) has a plurality of conductor segments (31, 31') which are connected to one another and each have one axially internal inner section (31b) and two axially external outer sections (31a, 31c), wherein the inner sections (31b) are embedded into the slots (27) of the stator yoke (5), wherein ducts (29) for coolant (21) to flow through in the axial direction are formed at least in a portion of the slots (27), wherein the stator (3) has, at least in a first axial end region (15), a first coolant chamber (13) which is fluidically encapsulated in relation to the area surrounding it and which surrounds at least a portion of the outer sections (31a) of the conductor segments (31), which outer sections are situated in this first axial end region (15), and wherein the first coolant chamber (13) is fluidically connected to the ducts (29) of the slots (27) in order to conduct coolant (21) into these ducts (29) and/or out of said ducts.

In some embodiments, the first coolant chamber (13) is designed, in the first axial end region (15), for feeding coolant (21) into the ducts (29) of the slots (27), and the opposite second axial end region (17) is designed as a coolant outlet side of the ducts (29).

In some embodiments, the stator winding (4) can be connected to an outer electrical circuit by means of electrical connections (41), wherein these electrical connections (41) are arranged exclusively in the second axial end region (17) of the stator winding which is opposite the first axial end region (15).

In some embodiments, there is, in a second axial end region (17) which is opposite the first axial end region (15), a second coolant chamber (14) which is fluidically encapsulated in relation to the area surrounding it and which surrounds at least a portion of the outer sections (31c) of the conductor segments (31), which outer sections are situated in this second axial end region (17).

In some embodiments, the stator yoke (5) is connected, in the first axial end region (15), to a covering plate (49), wherein the first coolant chamber (13) is sealed off in a fluid-tight manner in relation to this covering plate (49), and wherein the covering plate (49) has a plurality of openings (50) which fluidically couple the first coolant chamber (13) to the ducts (29) of the slots (27).

In some embodiments, the stator winding (4) is provided, in the region of the inner sections (31b), with an impregnating agent (35) which fluidically seals off the ducts (29) of the slots (27) in relation to the outer surrounding area.

In some embodiments, the stator winding (4) is formed by electrically connecting a large number of prefabricated hairpin-shaped conductor elements (55), wherein each of these hairpin-shaped conductor elements (55) has two inner sections (31b).

In some embodiments, the stator winding (4) is formed by electrically connecting a large number of prefabricated rod-shaped and/or L-shaped conductor elements (59, 63).

In some embodiments, the ducts (29) of the slots (27) are formed by intermediate spaces between the inner sections (31b) of the conductor segments (31), which intermediate spaces extend in the axial direction, or the ducts (29) of the slots (27) are formed by coolant pipes (33) within which the inner sections (31b) of the conductor segments (31) are arranged.

In some embodiments, at least for a first subset of the conductor segments (31), the inner sections (31b) of the conductor segments (31) are designed as hollow conductors, so that the ducts (29) of the slots (27) are formed by the interiors of the conductors.

In some embodiments, for a second subset of the conductor segments (31), the inner sections (31b) are designed as solid conductors.

In some embodiments, those sections of the conductor segments (31, 63) which are embodied as hollow conductors are electrically connected to one another by conductor sections (65) which are embodied in solid form.

In some embodiments, at least a portion of the outer sections (31a, 31c) of the conductor segments is embodied as a hollow conductor, wherein these hollow conductors have, in the region of the outer sections (31a, 31c), openings (43) in order to feed coolant (21) into the hollow conductor and/or conduct coolant out of the hollow conductor.

As another example, some embodiments include an electrical machine (1) comprising a stator (3) as described above and a rotor (7).

In some embodiments, the electrical machine (1) is can-free.

BRIEF DESCRIPTION OF THE DRAWINGS

The teachings herein are further described on the basis of a few exemplary embodiments with reference to the appended drawings, in which.

Identical or identically acting elements are identified by the same reference symbols in the individual figures.

DETAILED DESCRIPTION

Figure 1:
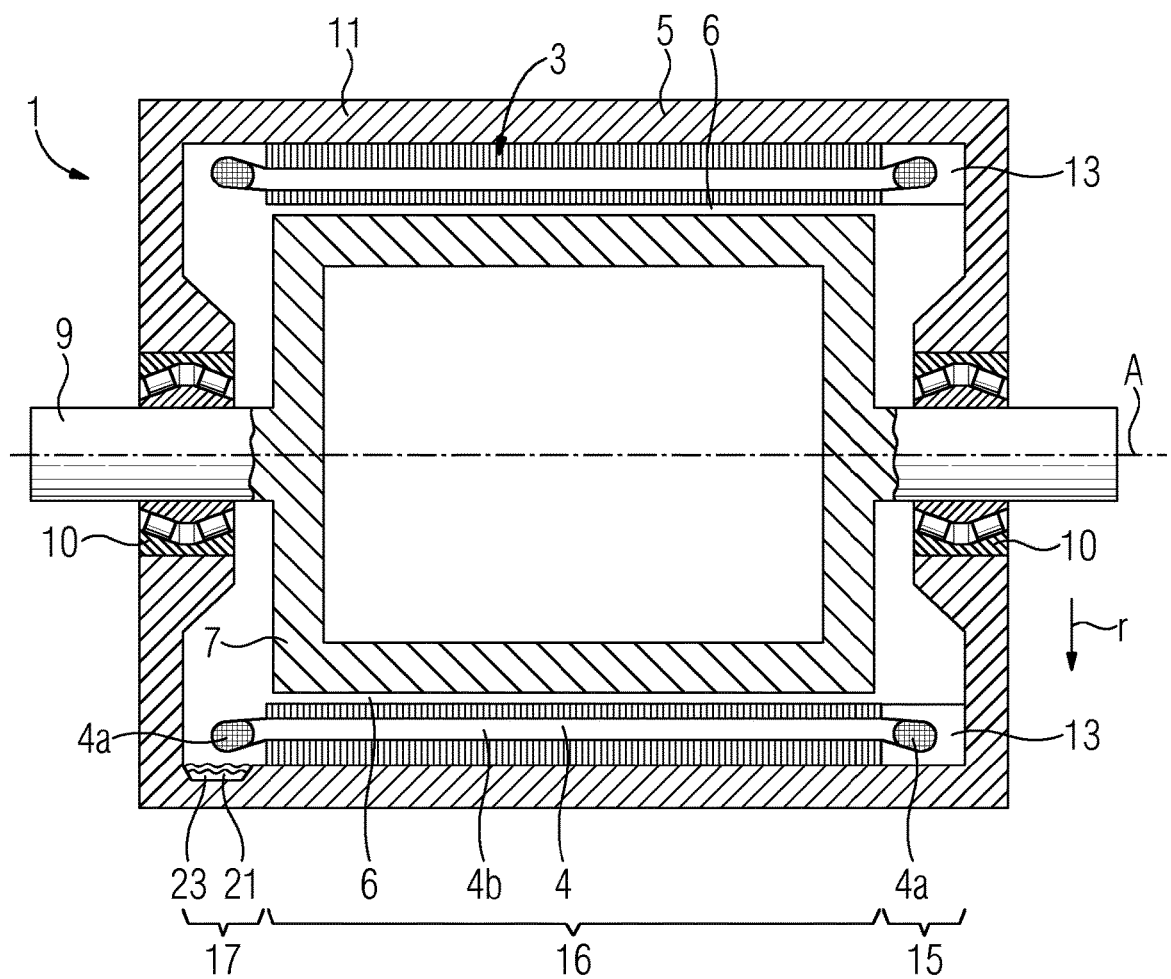
FIG. 1 shows a schematic longitudinal section through an electrical machine incorporating teachings of the present disclosure.

In some embodiments, a stator is designed for operation in an electrical machine with a central axis A. Said stator comprises a stator winding and a stator yoke with a plurality of slots, wherein the stator winding has a plurality of conductor segments which are connected to one another and each have one axially internal inner section and two axially external outer sections. In this case, the inner sections are each embedded into the slots of the stator yoke. Ducts for coolant to flow through in the axial direction are formed at least in a portion of the slots. The stator has, at least in a first axial end region, a first coolant chamber which is fluidically encapsulated in relation to the area surrounding it and which jointly surrounds at least a portion of the outer sections of the conductor segments, which outer sections are situated in this first axial end region. In this case, the first coolant chamber is fluidically connected to the ducts of the slots in order to conduct coolant into these ducts and/or out of said ducts.

Said ducts of the slots are intended to be understood, in general, to be open regions which are suitable for coolant to flow through in the axial direction. That is to say, in particular, no additional pipe walls which delimit these ducts have to be provided. For example, it suffices when these ducts are designed as open regions between the conductor segments, without additional wall material for delimiting the ducts having to be introduced into the slots. In some embodiments, the ducts allow an axial flow of coolant through the slots, so that the coolant can axially flow in close physical proximity to the conductor segments of the stator winding and can thereby draw heat from the winding in an effective manner.

To this end, the coolant within the slot ducts may be even in direct contact with the inner sections of the conductor segments of the stator winding. Therefore, here, the thermal coupling between the coolant and the stator winding can have a direct effect and does not have to be provided by further thermally conductive elements. This has the result that the heat which is released during operation of the stator is already dissipated in a particularly effective manner at the location at which it is produced. Therefore, overheating of the stator winding can be avoided. The manner of stator cooling described herein may be very efficient since, owing to the close thermal coupling between the winding and the coolant, a prespecified cooling effect can even be achieved with a comparatively low level of coolant throughflow.

In some embodiments, the ducts are generally sealed off in a fluid-tight manner in the radial direction in the direction of the rotor of the electrical machine. This has the effect that there is no coolant loss from the region of the stator to the region of the rotor. The ducts which run in the slots may be sealed off in a fluid-tight manner radially on all sides and are open only in their axially external end regions in order to be able to conduct coolant in and, respectively, out. At the first of these axial end regions, the slot ducts are fluidically coupled to the first coolant chamber which is arranged there. In other words, the duct openings merge, at this axial end, with inflows and/or outflows of the first coolant chamber. In particular, these are, at the prespecified first axial end region, either only inflows from the first coolant chamber into the slot ducts or only outflows from the first coolant chamber into the slot ducts as standard.

The described fluidic encapsulation of the first coolant chamber is to be understood to mean that this coolant chamber is sealed off in a fluid-tight manner at least in relation to radially external and radially internal regions and also axially toward the outside. The coolant chamber is fluidically connected to said slot ducts toward the axially internal side. Apart from these connections, said coolant chamber is, in particular, also fluidically sealed off in relation to this side. In addition, it should not be precluded that supply lines or discharge lines for connection to a superordinate coolant circuit are present on the other side. The encapsulation should merely prevent free exchange of coolant with the surrounding regions. This encapsulation renders it possible, in particular, to form an overpressure or else an underpressure in comparison to the outer surrounding area in order to in this way convey the throughflow of coolant, through the ducts, into the slots. These ducts can be oriented, in general, in the axial direction or they can be arranged obliquely and therefore also have an axial directional component. In some embodiments, said ducts are designed such that they render possible coolant flow with an axial directional component. Therefore, they can be arranged, for example, either as straight or as obliquely running slots on a common cylinder lateral surface of the stator.

Said first coolant chamber can extend, as a continuous chamber, over the entire periphery of the stator. In some embodiments, it can be a continuous annular hollow space which is delimited in each case on the inside and on the outside by a wall in the form of a cylinder casing. It is expedient when this coolant chamber surrounds all outer sections of the conductor segments which are situated in the associated first axial end region of the stator. In some embodiments, all corresponding conductor segment ends are then arranged within the same coolant chamber on this side. These axially external conductor segment ends are also called end windings in the art. Therefore, all end windings of the first axial end region of the stator may be arranged in a common end winding chamber.

In some embodiments, the first coolant chamber may be subdivided, starting from a cylindrical basic structure, into a plurality of subchambers which each correspond to peripheral segments of the stator. In some embodiments, the number of these peripheral segments corresponds to the number of pole pairs of the electrical machine. In said axial end region, the end winding chamber is therefore then split into a plurality of subchambers, wherein each subchamber contains only the end windings of the associated peripheral segment.

In the described design of the stator, a coolant flow through the slot ducts in the axial direction may be created starting from the first coolant chamber. This is rendered possible particularly by way of it being possible for a pressure gradient to be formed over the length of the slot ducts by an encapsulation of said coolant chamber in the region which surrounds the end windings. Therefore, owing to an overpressure in the first coolant chamber, coolant can be fed into the slot ducts or, conversely, owing to an underpressure in the coolant chamber, coolant can be conducted out into the region of the end windings. Irrespective of the direction of the pressure gradient, a plurality of slot ducts are coupled to a common coolant chamber in the axial end region and therefore the supply of coolant to the slot ducts is substantially more simple than if this had to be provided using separate coolant connections in each case.

In some embodiments, an electrical machine has a stator as described herein and also a rotor. The advantages of an electrical machine incorporating the teachings herein are produced analogously to the above-described advantages of a stator incorporating the teachings herein. The described refinements of the stator and of the electrical machine can advantageously be combined with one another.

In some embodiments, in the stator, the first coolant chamber can be designed, in the first axial end region, for feeding coolant into the ducts of the slots, wherein the opposite second axial end region of the stator is designed as a coolant outlet side of the ducts. In other words, the stator is configured such that all slot ducts transport the coolant in the same superordinate axial direction. To this end, the slot ducts do not all have to lie exactly parallel, but they have a common axial inlet side and a common axial outlet side.

Generally conveying coolant through the plurality of slot ducts can be driven jointly by a superordinate pressure gradient between the two axial end regions. In some embodiments, there is a common coolant chamber in the first axial end region, that is to say only on the coolant inlet side, and the slot ducts are open in the second axial end region, that is to say on the coolant outlet side. Therefore, approximately ambient pressure prevails on the outlet side, and the coolant can be conveyed through the ducts owing to an overpressure in the first (and here only) coolant chamber. In this case, it is immaterial for this functional principle whether this first coolant chamber is present as a continuous annular chamber or as an arrangement comprising a plurality of segmented subchambers, as described further above. Even when the slot ducts are open in the second axial end region, the coolant can nevertheless be supplied to a superordinate coolant circuit once again. An encapsulated coolant chamber as in the first axial end region is not required for this purpose since the coolant emerging here can also be collected at ambient pressure, for example, in an open collection container within the stator and from here can be supplied from the coolant circuit once again.

In an embodiment with encapsulation only on one side, the stator winding can be connected to an outer electrical circuit by means of electrical connections, wherein these electrical connections are arranged exclusively in the second axial end region of the stator winding. In other words, here, the outer electrical connections should therefore be provided only on the coolant outlet side. When the opposite coolant inlet side in the region of the first coolant chamber is formed as a high-pressure side, this type of contact-connection may be advantageous since, in this case, no bushings for electrical connections have to be provided on the high-pressure side. In some embodiments, coolant can be fed from the at least one first coolant chamber in the first axial end region owing to an overpressure, without bushings for the electrical connections being required through this first coolant chamber. Therefore, here, this type of coolant feeding into the slot ducts does not lead to an increase in the outlay on equipment in the case of the electrical contacts.

In some embodiments, the stator has, in the second axial end region which is opposite the first axial end region, a second coolant chamber which is fluidically encapsulated in relation to the area surrounding it. This second coolant chamber can surround at least a portion of the outer sections of the conductor segments, which outer sections are situated in this second axial end region. In other words, the end windings of the stator winding in the two axial end regions are arranged within encapsulated end winding chambers. Therefore, here, the coolant emerging from the slot ducts is directly collected in the region of the end windings within an encapsulated chamber on the outlet side too, this making it easier for said coolant to return from here to a superordinate closed coolant circuit.

In the stator, the stator yoke can, in general, be connected in the first axial end region to a covering plate, wherein the first coolant chamber is sealed off in a fluid-tight manner in relation to this covering plate, and wherein the covering plate has a plurality of openings which fluidically couple the first coolant chamber to the ducts of the slots. In other words, the first coolant chamber is closed off in a fluid-tight manner by the covering plate on its axially internal side, with the exception of its openings to the slots or the slot ducts. This prevents coolant from emerging in regions of the slots or of the stator yoke which do not correspond to the interior of the slot ducts. This ensures that no coolant is lost to the area surrounding the coolant chamber.

In order to provide the corresponding fluid-tight sealing-off operation, in particular, an inner cylinder casing-like boundary wall and also an outer cylinder casing-like boundary wall should be sealed off in relation to said covering plate. In order to render a sealing-off operation of this kind possible, the covering plate is configured, in particular, such that it also has a closed peripheral edge in the region of the slots. Overall, this covering plate can have a similar basic shape to the stator yoke. In particular, the stator yoke can be composed of individual stacked laminations, that is to say can be configured as a stator laminated core, wherein the covering plate, in terms of its shape, can largely resemble these laminations. The covering plate also may have openings in the region of the slots in order to render possible bushings from the first coolant chamber into the respective slot ducts. However, the slot slits may be closed in order to render possible fluid-tight sealing off of the outer wall of the coolant chamber in relation to the covering plate.

The stator winding may include, at least in the region of the inner sections, with an impregnating agent which fluidically seals off the ducts of the slots in relation to the outer surrounding area. This may be advantageous in the case of embodiments of the kind in which the slot ducts are not already delimited by a fluid-tight wall from the outset, that is to say, for example, in embodiments in which the slot ducts are formed by cutouts between the internal conductor segments of the stator winding.

Cutouts of this kind can be created, for example, by placeholders within the slots, which placeholders are removed after the arrangement of the conductor segments and thereby create a hollow space. This removal operation can be performed either before or after the impregnation is applied, depending on the mechanical stability of the conductor segments. In some embodiments, cutouts of this kind can also be produced owing to the shape of the conductor segments themselves. For example, a plurality of conductor segments with a U-shaped cross section can be stacked one above the other. In this case too, a respective hollow space, through which coolant can flow in the axial direction, is produced within the individual "U"s.

Irrespective of the exact design of cutouts of this kind, said cutouts can be closed off in a fluid-tight manner in relation to the area surrounding them by way of an impregnating agent being introduced into the winding, said impregnating agent not filling the hollow spaces however, but rather only additionally sealing off said hollow spaces toward the outside. This can be achieved, for example, by way of the capillary effect being employed in order to allow impregnating agent to enter only the relatively narrow intermediate spaces between the conductor segments and not the ducts themselves. In addition, the stator winding can be kept free of impregnating agent when the impregnating agent is applied in one or both axial end regions, so that the impregnating agent cannot enter the slot ducts from there. This can be performed, for example, by dipping on one side or by locally applying impregnating agent in the axially internal region. In some embodiments, the impregnating agent may be designed, in particular, such that it seals off the slot ducts from an air gap of the machine. In this way, coolant can be effectively prevented from emerging into the region of the rotor of the electrical machine.

In some embodiments, a potting compound can be applied in at least one axial end region of the stator, which potting compound seals off the conductor segments which are guided from the first coolant chamber into the regions of the slots in relation to an axially internal boundary wall of the coolant chamber. An axially internal boundary wall of this kind of the coolant chamber can be, for example, the abovementioned covering plate. The conductor segments of the stator winding generally extend from a region within the slots into the axially further external region within the coolant chamber. The ducts firstly have to be open toward the coolant chamber in order to render possible exchange of the coolant. Secondly, the duct walls should also be sealed off in relation to the remaining outer surrounding area in the region of these openings. This can advantageously be achieved by the described potting compound. When the ducts of the slots are defined by pipes, these pipes can advantageously extend into the region of the first coolant chamber. In this case, said potting compound can seal off the pipes in relation to the inner axial boundary wall of the coolant chamber in the region of the passage. Said pipes may be, in particular, the conductor segments themselves which, at least in this region, can be of pipe-like design.

In some embodiments, the stator winding may be formed by electrically connecting a large number of prefabricated hairpin-shaped conductor elements. Here, each of these hairpin-shaped conductor elements can have two axially internal inner sections which are connected to one another by an axially external section, which is bent in a U shape, to form an overall hairpin-shaped conductor element. In order to form the stator winding, a large number of hairpin-shaped conductor elements of this kind can be electrically connected to one another at their open ends such that a superordinate winding is produced. In this case, the number of hairpin-shaped conductor elements corresponds to the number of turns, wherein the number of conductor segments is twice as high in comparison since each turn has two inner sections. A substantial advantage of an embodiment with hairpin-shaped conductor elements may be that these can be easily prefabricated and that a large number of parts of identical construction can be subsequently combined to construct the winding. In this case, each hairpin-shaped conductor element can be pre-formed in a mechanically stable manner and no longer has to be substantially deformed (apart from possibly bending at the open end of the hairpin) when they are assembled to form a superordinate stator winding.

In some embodiments with hairpin-shaped conductor elements, it may be generally advantageous when the open part of the hairpin is arranged in the first axial end region and therefore in the first coolant chamber. This can be, in particular, the coolant inlet side. This may be advantageous primarily in an embodiment with hairpins which are formed from hollow conductors since the hollow open end of the hairpin can then be used to feed coolant from the first coolant chamber into the interior of the conductor elements. The outlet of the coolant can then take place in the opposite second axial end region, for example, through at least bone or another kind of recess in the bent region of the hairpin-shaped conductor.

In some embodiments, the stator winding can be formed by electrically connecting a large number of prefabricated rod-shaped and/or L-shaped conductor elements. In contrast to the previous example with hairpin-shaped conductor elements, each conductor element forms only one axially internal inner section of a conductor segment here. Similarly to the embodiments with hairpin-shaped conductor elements, a substantial advantage here may be the option to subsequently connect a large number of identical prefabricated conductor elements to form a superordinate stator winding, without the shape of the conductor elements having to be substantially changed in the process. In this case too, it is possible to embody said conductor elements as hollow conductors, so that the conductor interiors can form the slot ducts in the interior of the slots.

In some embodiments, the ducts of the slots are formed by intermediate spaces between the inner sections of the conductor segments, which intermediate spaces extend in the axial direction. In other words, the conductor segments themselves at least partially form the boundary walls of the slot ducts, but wherein the slot ducts are not guided completely within the individual conductors (as in the case of the hollow conductor) but rather between the conductors. This can be achieved, for example, by the described stacking of a plurality of U-shaped conductors. Another possible way of forming intermediate spaces between the inner sections of the conductor segments is, as described further above, to introduce spacers into the stator winding and to remove said spacers after the winding has been produced, as a result of which hollow spaces for the axial passage of coolant are formed, which hollow spaces likewise run next to the conductor segments.

In some embodiments, the ducts of the slots can also be formed by coolant pipes which are additionally introduced into the slots. Either pipes of this kind can be guided next to the inner sections of the conductor segments or else the inner sections of the conductor segments can be guided within pipes of this kind. A particular advantage of the last-mentioned variant may be the coolant can come into direct contact with the inner sections of the conductor segments here and that a fluid-tight configuration of the slot ducts is nevertheless provided, together with ease of production at the same time.

In some embodiments, at least for a first subset of the conductor segments, the inner sections of these conductor segments are designed as hollow conductors, so that the ducts of the slots are formed by the interiors of the conductors themselves. The above-described advantages are provided in this case too, specifically direct contact between the coolant and the conductor segments, a fluid-tight configuration of the slot ducts and also ease of production of these ducts. This may prevent the introduction of additional material into the slots of the stator yoke by the simultaneous use of the conductor as a duct wall. Improved utilization of space in the slot cross section can be achieved in this way. Furthermore, owing to the design as hollow conductors, the geometry of the ducts can be well defined and an impregnating agent which is optionally introduced into the stator winding cannot enter the interiors of these slot ducts when the axial end regions are protected against impregnating agent. When hairpin-shaped, L-shaped and/or rod-shaped conductor segments are used, these prefabricated segments can, as described above, particularly advantageously be designed as hollow conductors.

In the described embodiment with hollow conductors, it is not necessary for all conductor segments within the slots to be embodied as hollow conductors. It may also be advantageous, for a second subset of the conductor segments, for the inner sections to be designed as solid conductors. In other words, hollow conductors and solid conductors can thus be present next to one another within the stator winding. In particular, hollow conductors and solid conductors can be present next to one another within the same slot. Particularly good utilization of the available slot cross section can also be achieved in this way, wherein the proportion of hollow conductor material used can be matched to the coolant throughflow required in order to achieve the desired cooling effect within the winding.

In an embodiment with hollow conductors, in particular those sections of the conductor segments which are embodied as hollow conductors can be electrically connected to one another by conductor sections which are embodied in solid form. A solid conductor connection of this kind can be provided, for example, only in one axial end region or else in both axial end regions. For example, a plurality of hollow hairpin-shaped conductor elements can be connected to one another, at their open ends, by solid conductor sections in a common axial end region in each case. This can be expediently be the end region at which coolant is fed into the open ends of the hollow conductor. However, the connection by means of solid conductor elements is possible and advantageous in rod-shaped or L-shaped hollow conductors too. In general, the use of solid connecting elements is possible by way of the first coolant chamber fluidically coupling the interiors of the individual hollow spaces to one another and the current guidance through the superordinate stator winding not having to take place parallel in relation to the coolant guidance through the conductor sections. In particular, coolant can flow through the electrical forward conductors and return conductors of the stator winding in the same axial direction. As a result, the conductor segments in the axial end regions do not have to be designed to further transport coolant to the electrical downstream winding section in each case.

In an embodiment of the stator in which at least a portion of the outer sections of the conductor segments is embodied as a hollow conductor, these hollow conductors can generally advantageously have, in the region of the outer sections, openings in order to feed coolant into the hollow conductor and/or conduct coolant out of the hollow conductor. In other words, openings can be provided in the hollow conductors in one or even in both axial end regions in order to couple the hollow conductors to a coolant supply and/or to a coolant discharge line. In this case, a fluidic coupling to a coolant chamber is present on at least one of the axial sides, which fluidic coupling is connected to a plurality of conductor segments of this kind. The described embodiment is particularly advantageous for conducting coolant out of hairpin-shaped hollow conductors on the coolant outlet side of the stator winding. Said coolant outlet side may be an open side of the slot ducts. In other words, the coolant outlet side does not have to be connected to a common coolant chamber, but rather the coolant chamber can be present, as described above, solely on the inlet side.

The electrical machine can—irrespective of its exact application and embodiment—generally be operated either as a motor and/or as a generator. In principle, said electrical machine can be designed as a synchronous machine. In some embodiments, said electrical machine can also be designed as an asynchronous machine. In general, the electrical machine can be an internal-rotor machine, that is to say in which the stator radially surrounds the rotor.

In some embodiments, the electrical machine can be configured such that the coolant used is circulated within a closed coolant circuit. To this end, the coolant can be collected on the coolant outlet side of the stator and can be supplied back to the coolant inlet side of the stator by means of a recooling unit. In this case, one or more further elements of the electrical machine can also optionally be cooled by the same coolant within this coolant circuit.

In some embodiments, the coolant may be an electrically insulating coolant, for example an insulating cooling oil. In some embodiments, said coolant may be, in principle, another coolant such as cooling water (in particular deionized cooling water) for example, or else an electrically conductive cooling oil.

In some embodiments, the electrical machine can be can-free. In other words, the electrical machine can be free of an additional pipe within the air gap which fluidically separates the interior of the slots of the stator from the radial region of the rotor. In some embodiments, the stator is free of an additional pipe of this kind, that is to say that a stationary (non-rotating) fluidically separating wall is not provided between the slot slits of the stator and the rotating parts of the electrical machine. In some embodiments, the air gap of the electrical machine can be embodied to be substantially narrower than in a machine in which fluidic separation by a stationary can of said kind is required. In the case of the stator, the fluidic encapsulation of those regions of the stator through which coolant flows is instead achieved by the described sealing off of the at least one coolant chamber and the slot ducts.

FIG. 1 shows a schematic longitudinal section through an electrical machine 1 according to a first exemplary embodiment of the teachings herein. The electrical machine 1 comprises a rotor 7 and a stator 3. The rotor 7 is mounted by means of a rotor shaft 9 such that it can rotate about a rotation axis, wherein this rotation axis corresponds to the central axis A of the machine and therefore also of the stator 3. In addition, the rotor shaft 9 is supported against the machine housing 11 by means of the bearing 10. The electrical machine may be, in principle, a motor or a generator or else a machine which can be operated in both modes.

The stator 3 has a stator winding 4 comprising a plurality of conductor turns which are arranged in the form of a distributed winding over the periphery of the stator 3. In this case, the stator winding 4 can also be subdivided into a plurality of closed-off peripheral segments. The stator winding 4 is embedded into slots of a stator laminated core 5 which is arranged in an axially internal region 16 of the stator 3 and acts as a stator yoke. Those portions of the stator winding 4 which are arranged in the axially internal region 16 primarily electromagnetic interact with a field of the rotor during operation of the electrical machine 1. To this end, the rotor 7 is equipped with a field excitation system, not illustrated here for reasons of clarity. This interaction takes place across an air gap 6 which is situated radially between the rotor 7 and the stator 3.

The stator winding 4 has an internal winding section 4b in which the inner sections of the individual conductor segments of the stator winding 4 are arranged. End windings 4a, by way of which the inner sections which are situated in the slots of the stator laminated core 5 are connected in the manner of a distributed stator winding 4, are located in the first axial end region 15 and in the second axial end region 16 in a manner axially adjoining said winding section.

The end windings 4a and therefore the outer sections of the stator winding 4 are arranged within an encapsulated first coolant chamber 13 in the first axial end region 15 in the example of FIG. 1. This first coolant chamber 13 is encapsulated in relation to the outer area surrounding it such that a coolant can be fed through a coolant inflow line, not illustrated here, under pressure. As will be explained in more detail in connection with the following figures, this coolant can be transported from the first coolant chamber 13, through the ducts which are arranged in the slots, to the second axial end region 17 in the axial direction and in this way efficiently cool the axially internal region 4b of the stator winding 4 within the slots. The first coolant chamber 13 is therefore fluidically coupled to these ducts. In the second axial end region 17 of the stator, the end windings 4a are not embedded into a similar coolant chamber in the example of FIG. 1, but rather are open in this end region 17. The coolant 21 which emerges from the slot ducts here can be collected in a collection region 23 and can be returned from here, through lines, not illustrated in any detail, to the coolant circuit.

Figure 2:
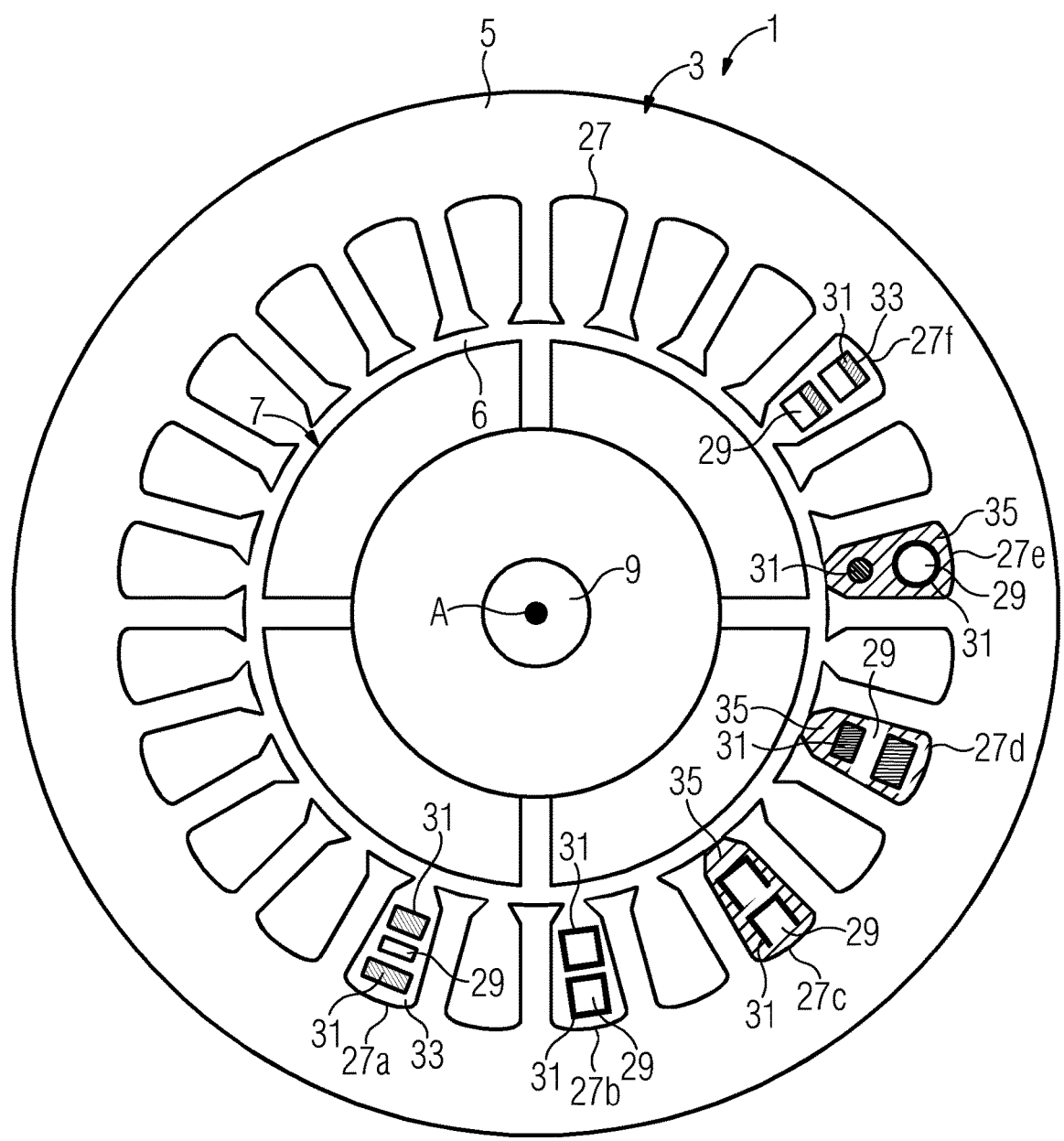
FIG. 2 shows a schematic cross section through an electrical machine incorporating teachings of the present disclosure.

FIG. 2 shows a schematic cross section through an electrical machine 1 according to a further exemplary embodiment of the teachings herein. Therefore, said figure shows a cross section perpendicularly in relation to the central axis of the electrical machine 1. In principle, this machine can be constructed in a similar manner to that illustrated in FIG. 1, that is to say with a first coolant chamber 13, which surrounds the end windings 4a, in the first axial end region 15 of the machine. The cross section illustrated in FIG. 2 is a section through the stator 3 and the rotor 7 in the axially internal region 16 of the machine. The machine housing 11 is not illustrated here for reasons of clarity. Said figure shows the stator laminated core 5 which, on the radially internal side of the stator 3, is provided with a plurality of slots 27 which are distributed over the periphery. The axially internal winding sections 4b of the stator winding 4 are embedded into these slots 27. Furthermore, ducts 29, within which a fluid coolant 21 can flow, are arranged within the slots. The inner sections of the conductor segments, which inner sections are guided within the slots, and also the ducts can be embodied very differently. Therefore, a plurality of different configurations are illustrated by way of example in FIG. 2:

the slot 27a exhibits, by way of example, two conductor segments 31 into the intermediate space between which a separate pipe 33 with a rectangular cross section is arranged, which pipe forms, in its interior, the duct 29 for the coolant. In some embodiments, the slot 27b exhibits two conductor segments 31 which are situated radially one above the other and are each designed as hollow conductors and therefore each form, in their interior, a duct 29 for coolant to flow axially through.

In some embodiments, the slot 27c exhibits two conductor segments 31 which are situated radially one above the other and each have a U-shaped cross-sectional profile. As a result, two ducts 29 are likewise formed within the respective "U"s. In the example of the slot 27c, the conductor segments 31 are additionally provided with an impregnating agent 35 here, which impregnating agent seals off the interior of the slot 27c in relation to the radially internal region of the rotor 7 in a fluid-tight manner. In this case, the impregnating agent is applied such that it does not fill the ducts 29 within the "U"s.

In some embodiments, the slot 27d exhibits two conductor segments 31 which are arranged in a radially spaced-apart manner and between which an axial duct 29 was kept free by a spacer which was removed after an impregnating agent 35 was introduced into the radially internal region of the slot. Therefore, a duct 29 for the axial flow of coolant is also present here, which duct is sealed off in a fluid-tight manner in relation to the region of the rotor. Fluid-tight sealing off by the stator laminated core itself is likewise present radially toward the outside. This sealing-off operation can additionally be intensified by the capillary suction of impregnating agent into these regions of the stator laminated core. Corresponding additional filling with impregnating agent can optionally also take place in the closed duct structures as in the slots 27a or 27b, 27e, 27f.

In some embodiments, the slot 27e exhibits two conductor segments 31, one of which is designed as a solid conductor segment and one of which is designed as a hollow conductor. Owing to the hollow conductor, an axial duct 29 is therefore likewise present within the slot here.

In some embodiments, the slot 27f exhibits two conductor segments 31 which are each embedded into the interior of an additional pipe 33. A fluid-tight encapsulation of the ducts 29 is also present here owing to the pipes 33. However, the slot can optionally also be filled with an additional impregnating agent here.

The configurations of the illustrated slots 27a to 27f are to be understood merely as examples and are intended to demonstrate the wide variety of possible embodiments. However, in a real stator, the slots which are distributed over the periphery are expediently either all embodied in an identical manner or a few configurations which are similar to one another alternate with one another. In some embodiments, there are more than two conductor segments within one slot or with other cross-sectional shapes of conductor segments 31 and/or separate coolant pipes 33. All that is necessary is that a duct 29 for coolant to flow through in the axial direction, which duct is sealed off in a fluid-tight manner in relation to the other regions of the stator and in relation to the rotor in particular radially to the inside and outside, is present at least in a portion of the slots 27. The coolant flowing in these ducts 29 can either be in direct thermal contact with the conductor segments 31, as in the slots 27b, 27c, 27d and 27e (in part) and 27f for example, or else said coolant can flow in close proximity to the conductor segments 31 and be thermally coupled to them by an impregnating agent 35 and/or an additional pipe wall for example.

In each case, heat can be drawn from the conductor segments 31 in an efficient manner owing to the arrangement of ducts 29 within the slots 27. These ducts 29 are fluidically coupled to the first coolant chamber 13 at the transition of the stator 3 to its first axial end region 15 such that coolant can be fed from the coolant chamber 13 into the ducts 29, or vice versa.

Figure 3:
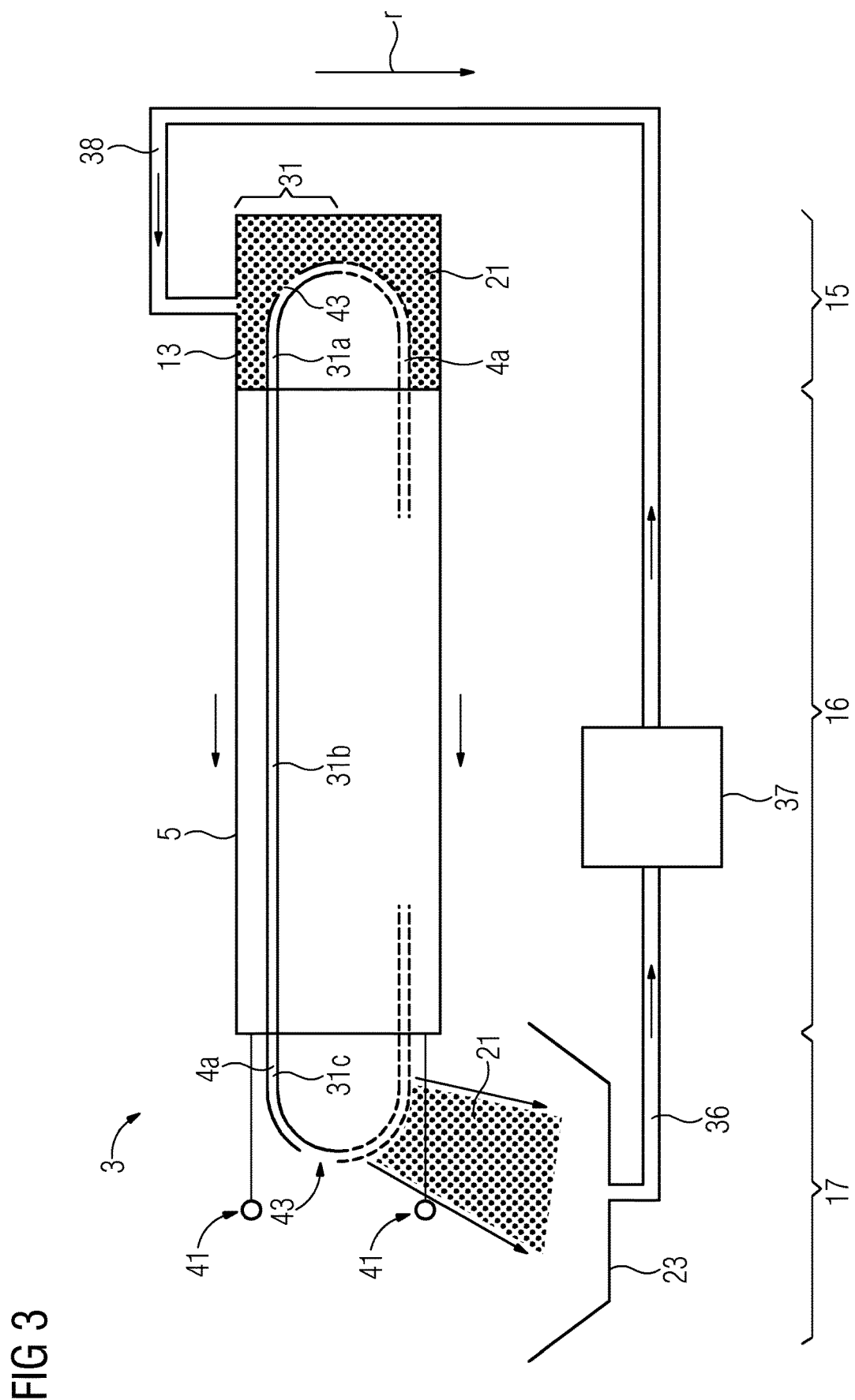
FIG. 3 shows a schematic longitudinal section through a stator incorporating teachings of the present disclosure.

FIG. 3 shows a schematic longitudinal section through a view of a detail of the lower region of a stator 3 according to a further embodiment incorporating the teachings herein. Said figure therefore shows a similar section to that in FIG. 1, but only the lower region of the stator, without the rotor and without the housing, is schematically illustrated. Said figure shows a selected conductor segment 31 which has an axially internal inner section 31b which, similarly to the manner shown in FIG. 2, is embedded into a slot, not illustrated here, of the stator laminated core 5. The conductor segment 31 is designed as a hollow conductor at least in an inner section 31b, so that, in its interior, a duct for coolant to flow axially through is defined by the conductor, similarly to the manner in the slot 27b of FIG. 2.

Similarly to the manner in the example of FIG. 1, a first coolant chamber 13 is also present in the first axial end region 15 here, said coolant chamber surrounding the end windings 4a of the stator winding on this side. These end windings 4a are formed by way of the, here horizontal, axial outer sections 31a of the respective conductor segments 31 being connected to one another. This is schematically illustrated in FIG. 3 by way of the outer section 31a of the selected conductor segment 31 (in solid lines) merging with the corresponding outer section of the next conductor segment (illustrated using dashed lines). The same applies for the opposite second axial end region 17. Since said stator winding is a distributed stator winding, the conductor segments which electrically adjoin the selected conductor segment 31 are, however, each arranged in a different peripheral position and therefore in another slot. The first coolant chamber 13 shown is intended to extend in an annular manner over the entire periphery of the stator in the example shown. In some embodiments, this chamber may be subdivided into individual peripheral segments. All that is necessary is that a plurality of conductor connections are jointly arranged in a common encapsulated chamber in the corresponding axial end region.

In the example shown in FIG. 3, the first axial end region 15, which has the encapsulated coolant chamber 13, corresponds to the coolant inflow side of the stator 3. To this end, this coolant chamber 13 is connected to a coolant supply line 38 of the coolant circuit of the stator. Furthermore, the pressure within the coolant chamber 13 is increased in relation to the ambient pressure, so that coolant can be conveyed from here, through the ducts 29 which are situated within the slots, in the direction of the opposite axial end region 17. In order to be able to feed the coolant 21 from the coolant chamber 13 into these ducts, at least one opening in the respective conductor segment 31 is present in this region. Openings of this kind can be configured differently. For example, said opening may be a bore or an open end of a hollow conductor which is electrically connected to the next conductor segment, for example by means of a solid conductor, a clip, a solder point or another type of electrical contact.

In the example shown, the conductor segment 31 also has at least one opening 43, through which coolant can emerge from the hollow conductor, in the second axial end region 17. Similarly to the manner in the example of FIG. 1, the second axial end region 17 is not encapsulated here either and the coolant 21 emerging here is collected in an open collection region 23. From here, said coolant is transported through a coolant return line 36 to a recooling unit 37 from where it again reaches the coolant supply line 38 and is once again fed into the first coolant chamber 13 in a closed circuit. The direction of the coolant flow is indicated by arrows throughout FIG. 3.

The entire stator winding 4 has a plurality of conductor segments similarly to the selected conductor segment 31 illustrated in FIG. 3. In this case, the number of conductor segments 31 of this kind corresponds to twice the number of coil turns since two conductor segments are required for each turn loop. Current flows in an annular manner over in each case one coil turn of this kind, in other words each coil winding has a forward conductor and a return conductor with respect to the axial current flow direction. In contrast to this alternating current flow direction, the flow direction of the coolant is uniform through all slot ducts 29 which are present within the stator 3. Therefore, as illustrated in FIG. 3, the coolant always flows from the first axial end region 15 toward the second axial end region 17 through the stator slots here.

In FIG. 3, the radial direction is indicated by the directional arrow r. In the detail shown of the stator 3, this directional arrow points radially outward. In this example, the stator winding 4 has two winding layers, so that, similarly to the manner in FIG. 2, an inner and an outer conductor segment are respectively guided in parallel within each slot. In the example of FIG. 3, the selected conductor segment 31 is a radially internal conductor segment, and the adjoining next conductor segments, indicated only using dashed lines, are each arranged on the radially external winding layer.

In the example of FIG. 3, the electrical connections 41 for contact-connecting the stator winding 4 to an outer electrical circuit are arranged solely in the second axial end region 17, that is to say on the coolant outlet side of the stator. This has the advantage that no electrical bushings have to be conducted through the pressurized first coolant chamber 13.

Figure 4:
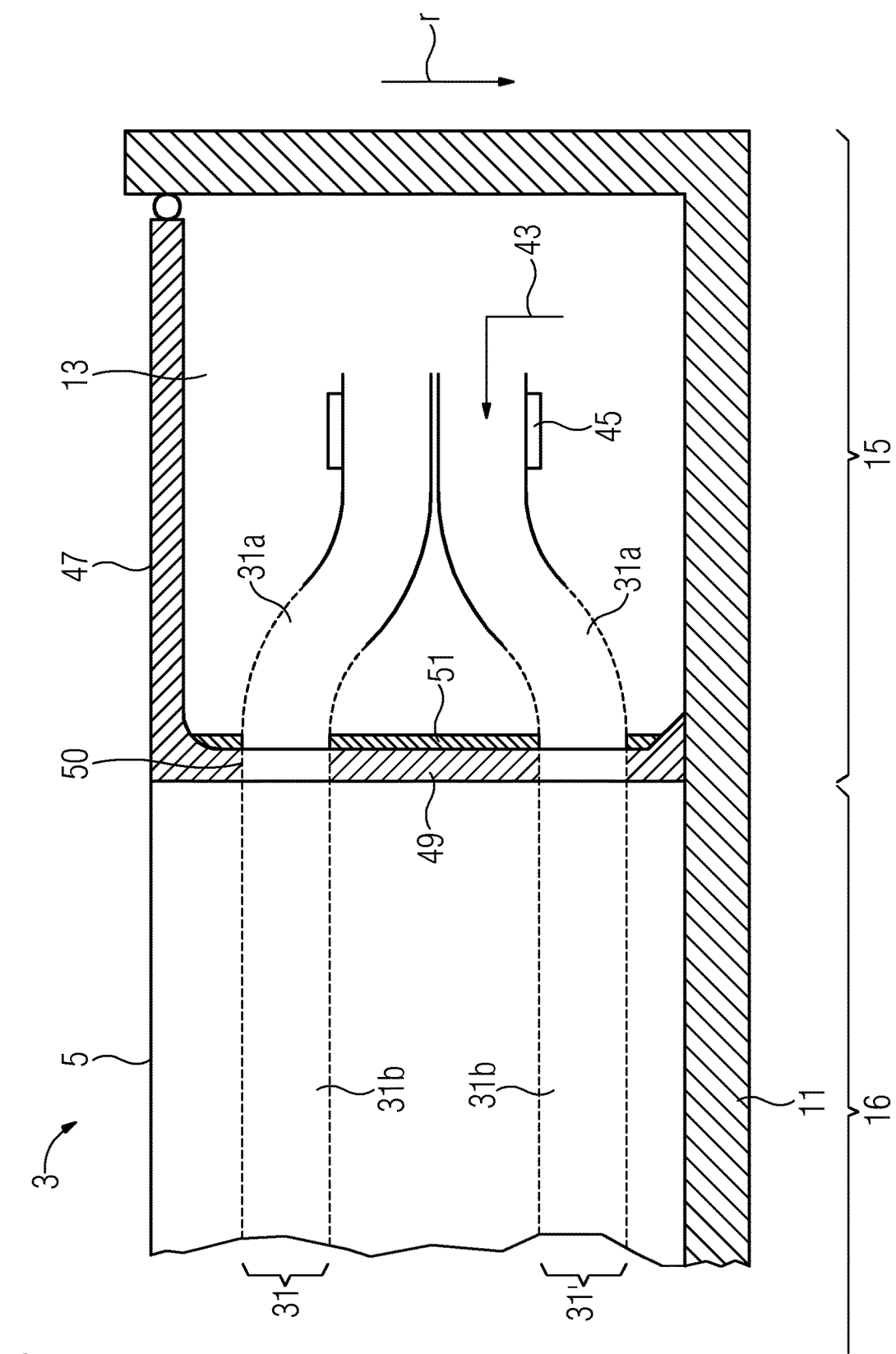
FIG. 4 shows a schematic longitudinal section of a detail of a stator incorporating teachings of the present disclosure.

FIG. 4 shows a schematic longitudinal section through a detail of a stator 3 according to a further embodiment of the teachings herein. This sectional illustration corresponds to the sectional illustrations of the two FIGS. 1 and 3, and the detail shown corresponds to the region which is illustrated in the bottom right of the two examples in said figures. Therefore, said region is the first axial end section 15 and the adjoining portion of the axially internal region 16. Said figure shows a portion of the housing 11 which is connected to the stator laminated core 5 in the internal region 16. FIG. 4 shows portions of two selected conductor segments 31 and 31', wherein one portion of the associated inner section 31b and the respectively adjoining outer section 31a are shown in each case.

The inner sections 31b are illustrated only using dashed lines here since they are guided within slots of the stator laminated core 5 and do not lie exactly within the sectional plane shown. Here, the sectional plane lies in the peripheral region which contains the electrical connection between the two outer sections 31a shown. This electrical connection is realized by an electrically conductive clip 45 here. In this case, an electrical connection between a radially internal conductor segment 31 of an internal winding layer and a radially external conductor segment 31' of an outer winding layer is produced here. The two conductor segments 31 and 31' shown are each designed as hollow conductors here. These hollow conductors are open in the axial end region 15, and therefore coolant can be fed from here, through these openings 43, into the conductor interior.

As in the preceding examples as well, coolant is fed here from the first coolant chamber 13 which is also formed as an end winding chamber which encloses the end windings here. In this example, the end windings are formed by the shown connection of the ends of the hollow conductors. A plurality of connections of this kind are also arranged within the same coolant chamber here. The coolant chamber 13 is delimited, on its axially external side, by a portion of the housing wall 11. Said coolant chamber is also delimited, on its radially external side (illustrated at the bottom here), by a portion of this housing wall 11 which is formed as an external cylinder lateral surface in this region. Said coolant chamber is delimited, on its radially internal side, by a further cylinder casing-like inner wall 47 which is sealed off in a fluid-tight manner in relation to the housing 11.

In the example shown, this inner wall 47 merges integrally with an annular covering plate 49 which seals off the stator laminated core 5 in relation to the first coolant chamber 13, wherein the openings 50, shown using dashed lines, are provided for inserting the conductor segments 31 and 31'. Therefore, with the exception of these openings 50, the coolant chamber 13 is delimited in a fluid-tight manner by the covering plate 49 axially toward the inside. In order to also seal off the region of these openings in a fluid-tight manner after the conductor segments are inserted, an additional potting agent 51 is applied here. When this potting agent is applied, the stator is expediently arranged such that the first axial end region 15 comes to lie at the top and the potting agent can then be accordingly distributed over the covering plate 49 from the top (that is to say axially on the outside). In order to delimit the potting agent 51 radially toward the outside during application, a potting border 53 is additionally provided in this example. After the potting agent has cured, the stator 3 can then be oriented with a horizontal axis again, as shown in FIG. 4. Therefore, an encapsulated coolant chamber 13, into which coolant can be fed from the outside by means of a supply line, not illustrated here, and can be conducted under pressure from the chamber into the openings 43 of the conductor segments 31, can be produced in a simple manner.

Figure 5:
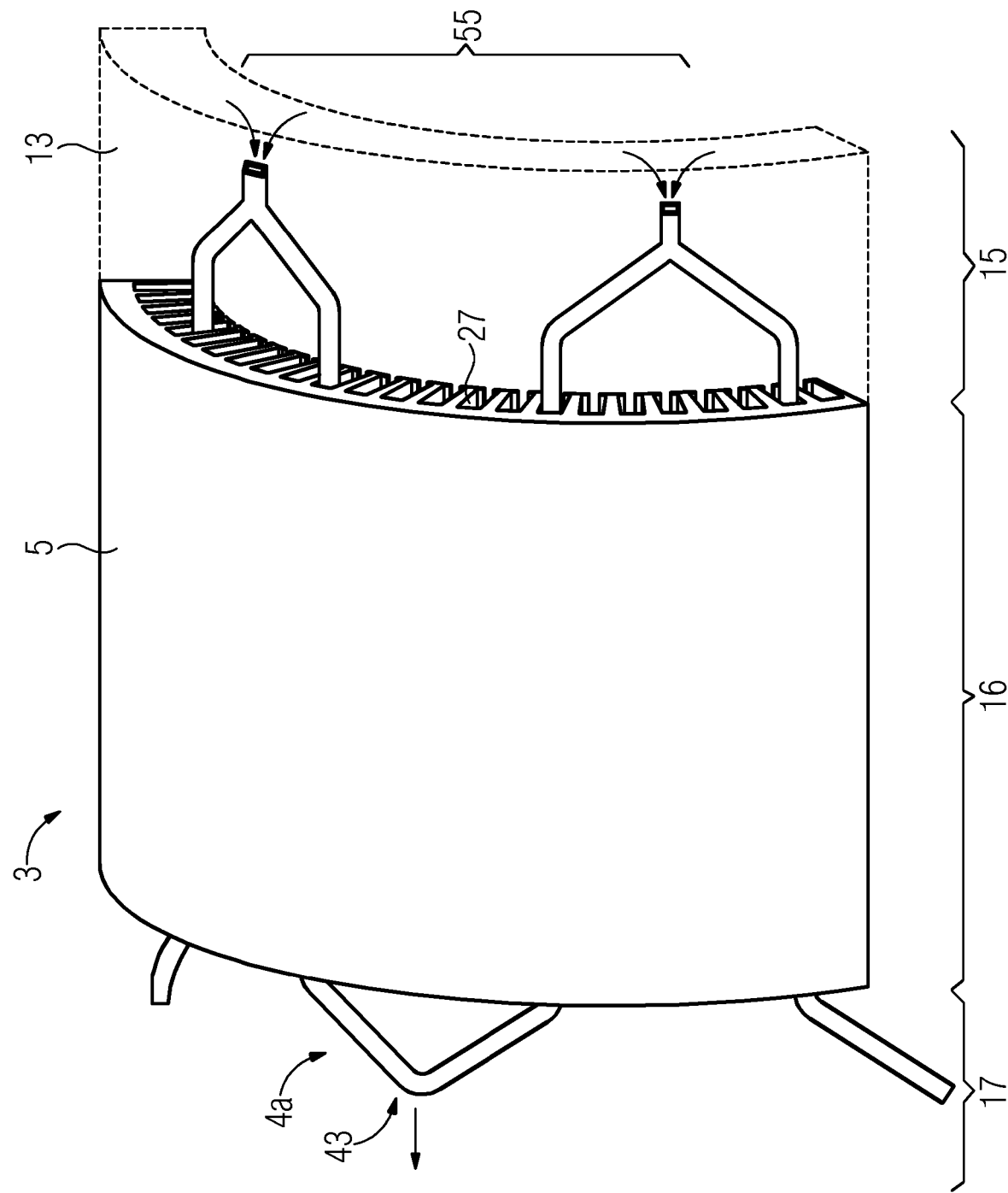
FIG. 5 shows a schematic outer view of a portion of a stator incorporating teachings of the present disclosure.

FIG. 5 shows a schematic outside view of a portion of a stator according to a further embodiment of the teachings herein. Analogously to the preceding examples, a first coolant chamber 13 is arranged in the first axial end region 15 of the stator, while the end windings 4a of the stator winding are open in the second axial end region 17 here too. In the example of FIG. 5, the individual conductor segments 31 which form the stator winding 4 are connected to form prefabricated hairpin-shaped conductor elements 55. For reasons of clarity, only an individual section of the distributed stator winding is shown here, which section, in the detail shown, comprises a complete hairpin-shaped conductor element 55 and also portions of two conductor elements which adjoin it and are electrically connected to it and constructed analogously to it. For better understanding, only one selected hairpin-shaped conductor element 55, without the adjoining elements and without the stator laminated core 5, is shown in FIG. 6.

In said figure, a respective hairpin-shaped conductor element 55 has two axially internal inner sections 31b and an axially external section 31c which is bent in a U shape and connects these two inner sections 31b to one another. This section 31c which is bent in a U shape is arranged in the second axial end region 17 of the stator and is therefore not surrounded by an end winding chamber or coolant chamber. However, the opposite open regions of the hairpin end within the first coolant chamber 13. The described hairpin-shaped conductor elements 55 are each designed as hollow conductors, wherein the hollow conductors are open at the open end of the hairpin, so that coolant can be fed from the first coolant chamber. In the section which is bent in a U shape, the hairpin-shaped conductor elements 55 are likewise each provided with at least one opening 43 which is designed as an additional bore here. The coolant can emerge again in the second axial end region 17 through these openings 43. Therefore, a uniform axial coolant flow direction 57 is also present here, said coolant flow direction being the same for all conductor segments and being independent of the current flow direction in the individual conductor segments. The described hairpin-shaped design of the conductors makes it easier to manufacture the winding since a large number of identical prefabricated parts can be used.

The shape may be selected such that a predefined distance between two slots which are to be electrically connected can be overcome by the opening of the hairpin. The hairpin can also be expediently shaped such that, for example, one of its straight inner sections 31b can be arranged on an internal winding layer and the other can be arranged on an outer winding layer. The complete stator winding is then produced by interleaving a large number of hairpins of this kind and by electrically connecting said hairpins within the individual electrical sections.

Figure 6:
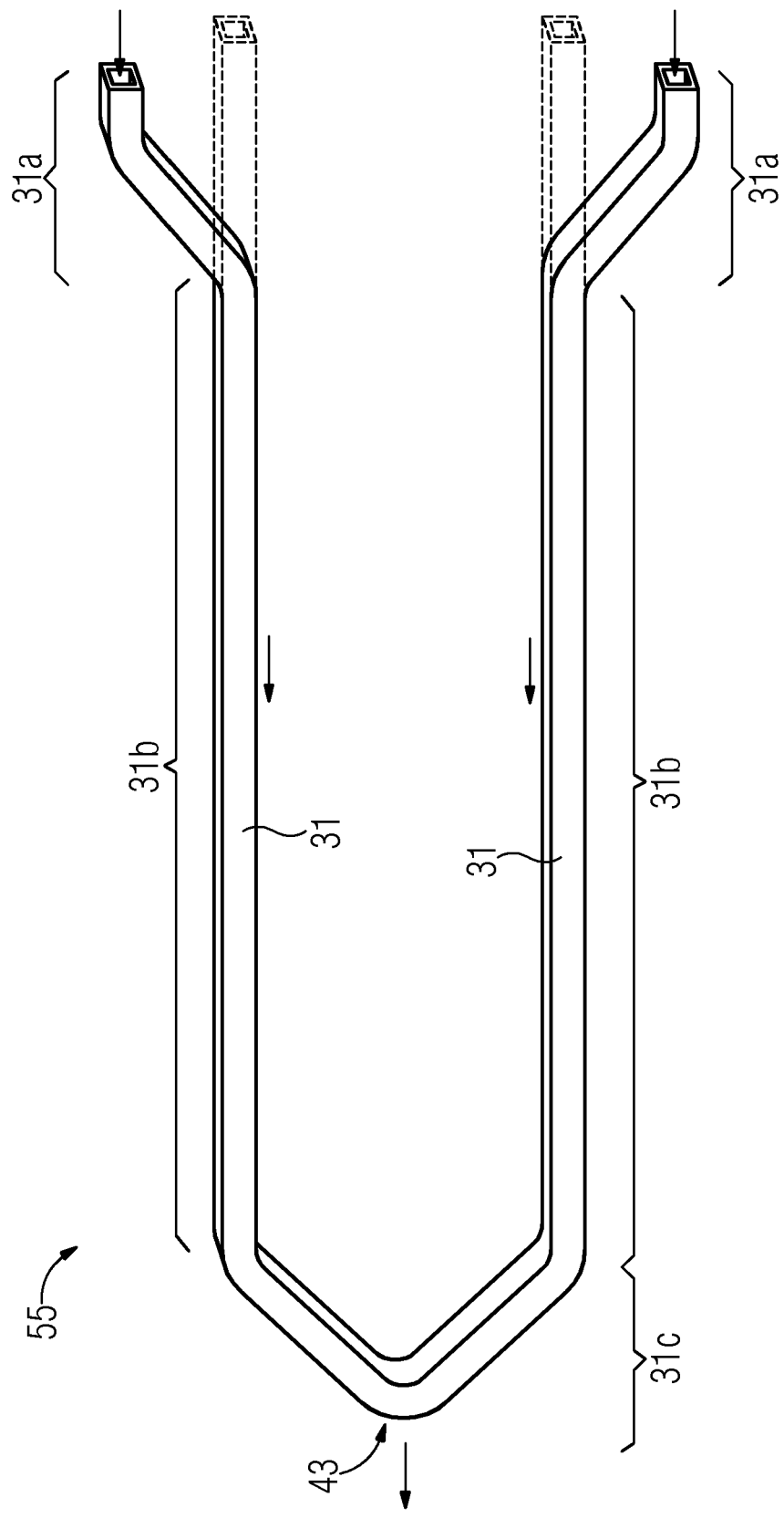
FIG. 6 shows a hairpin-shaped conductor element from the stator of FIG. 5.

The individual hairpin-shaped conductor element 55 of FIG. 6 has, at its right-hand-side, open end, two outer sections 31a which are bent away from one another. However, in order to be able to slide the hairpin-shaped conductor element 55 axially through the slots 27 of the stator laminated core 5, it is expedient for the prefabricated hairpin-shaped component to initially have straight outer sections 31a at this end, as indicated by dashed lines in FIG. 6. After the conductor elements are pushed through the slots, these outer sections 31a can then subsequently be bent into the shape shown in FIG. 5, so that electrical connection to the conductor elements which are adjacent within one section is rendered possible. A connection of this kind can again be made, in a similar manner to that in FIG. 4, such that the ends of the hollow conductors remain open, so that coolant can be fed into the hollow conductors on this side. On account of the finished stator having a large number of conductor sections (and not only one as shown in FIG. 5), coolant can be fed from the coolant chamber 13 into a large number of conductor segments of this kind at the same time.

In some embodiments, the hairpin-shaped design of the hollow conductor as in FIG. 5 includes a first coolant chamber 13 in the form of a common end winding chamber for feeding coolant to not be present, but rather, as an alternative, for the individual connecting regions of the conductor elements 55 which are to be connected to each be provided with a separate hose connection. Although the expenditure on equipment for forming the individual hose connections is somewhat higher here under certain circumstances, it is also possible to conduct coolant through the ducts of the parallel slots in a common axial transportation direction with this alternative variant.

Figure 7:
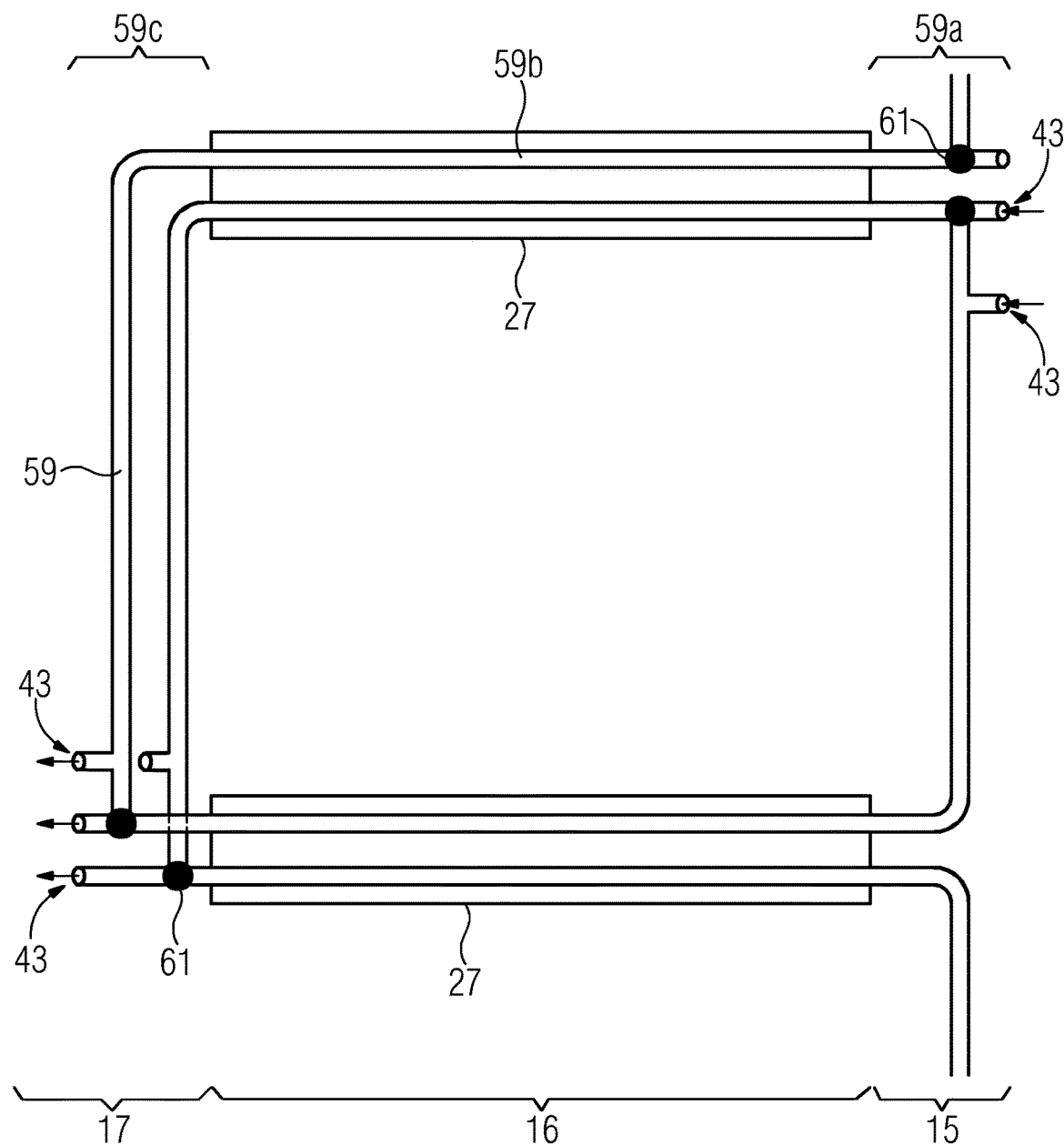
FIG. 7 and FIG. 8 show further alternative shapes of prefabricated conductor elements.

FIG. 7 shows an alternative design of a plurality of prefabricated conductor elements which can be used as an alternative to the hairpin-shaped conductor elements of FIGS. 5 and 6 in a stator incorporating the teaching herein. In the example of FIG. 7, the superordinate winding section is produced by electrically connecting a plurality of prefabricated L-shaped conductor elements 59. Each of these conductor elements has a long limb and a short limb, wherein the short limb in each case forms an outer section 59a or 59c and the long limb forms an inner section 59b of the associated conductor segment and the opposite outer section 59c or 59a. The number of conductor segments present in total therefore corresponds to the number of L-shaped conductor elements and therefore to twice the number of turns here. L-shaped hollow conductors are used in the example shown, wherein it is not necessary to connect the conductor interiors in the region of the electrical connection points 61.

As in the previous example, this is therefore possible because it is possible to jointly feed coolant into the hollow conductors from the common coolant chamber which jointly encloses the axial ends of the conductor segments at least on one side. Once again, coolant is fed in the first axial end region 15 and coolant is conducted out in the opposite second axial end region 17 through openings 43 in the hollow conductors, which openings can be formed either by the open conductor ends and/or by additional bores. In the axially internal region 16, the inner sections 59b are once again arranged in slots 27 of the stator laminated core. In the example shown, in each case two inner sections 59b of this kind are jointly arranged in one slot.

Figure 8:
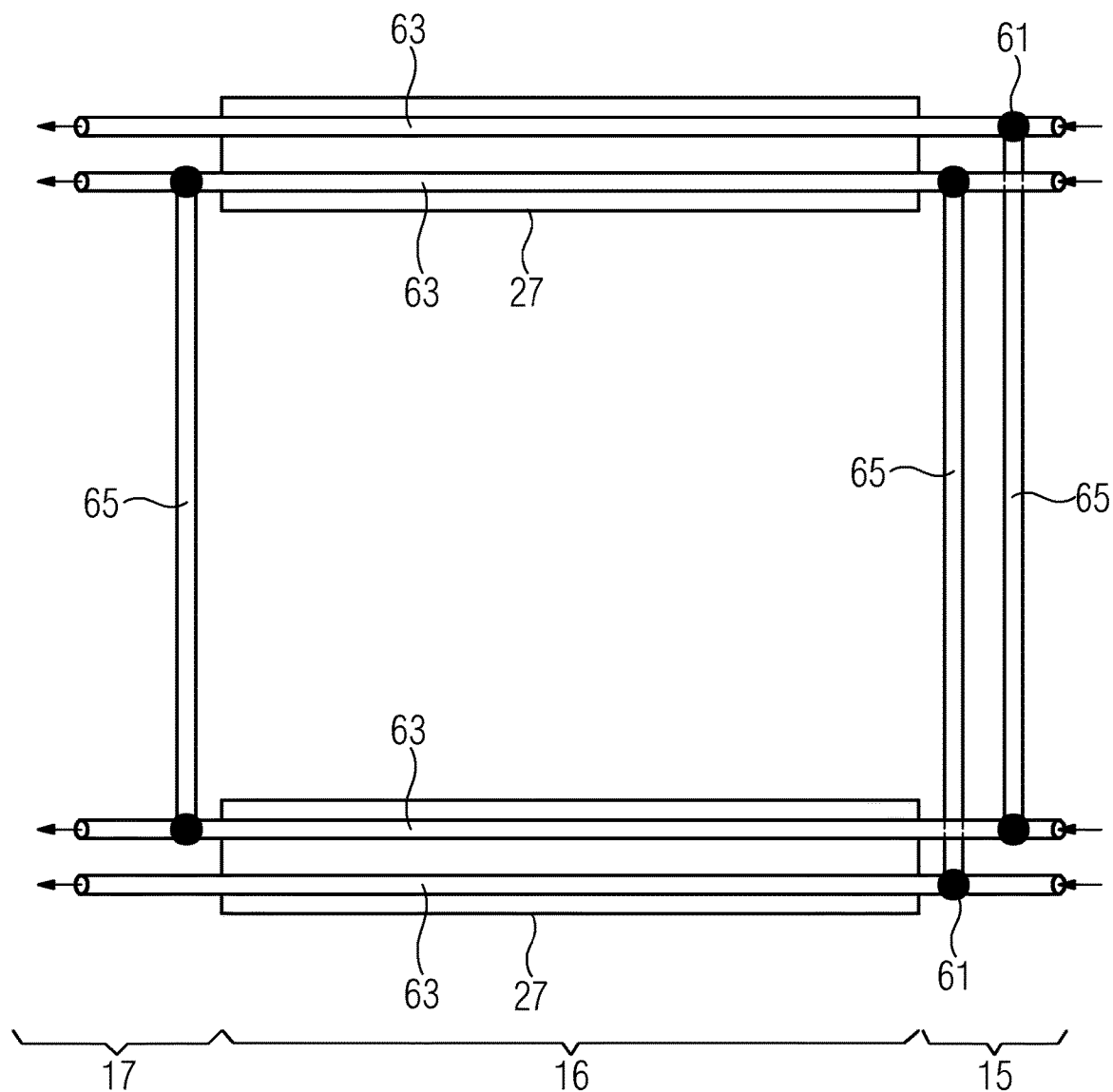

FIG. 8 shows a further alternative design of a plurality of prefabricated conductor elements 63, as can likewise be used in a stator incorporating the teachings herein. In contrast to the two previous examples, bar-like hollow conductors 63 which are electrically connected in their axial end regions by solid bar-type conductors are present here. The rest of the arrangement of the conductor elements, in particular the embedding into the slots and also the throughflow of coolant, are analogous to the previous examples. In this example too, coolant is fed into the open ends of the hollow conductors 63 from the coolant chamber 13, which jointly encloses said ends, at least in an axial end region.

Figure 9:
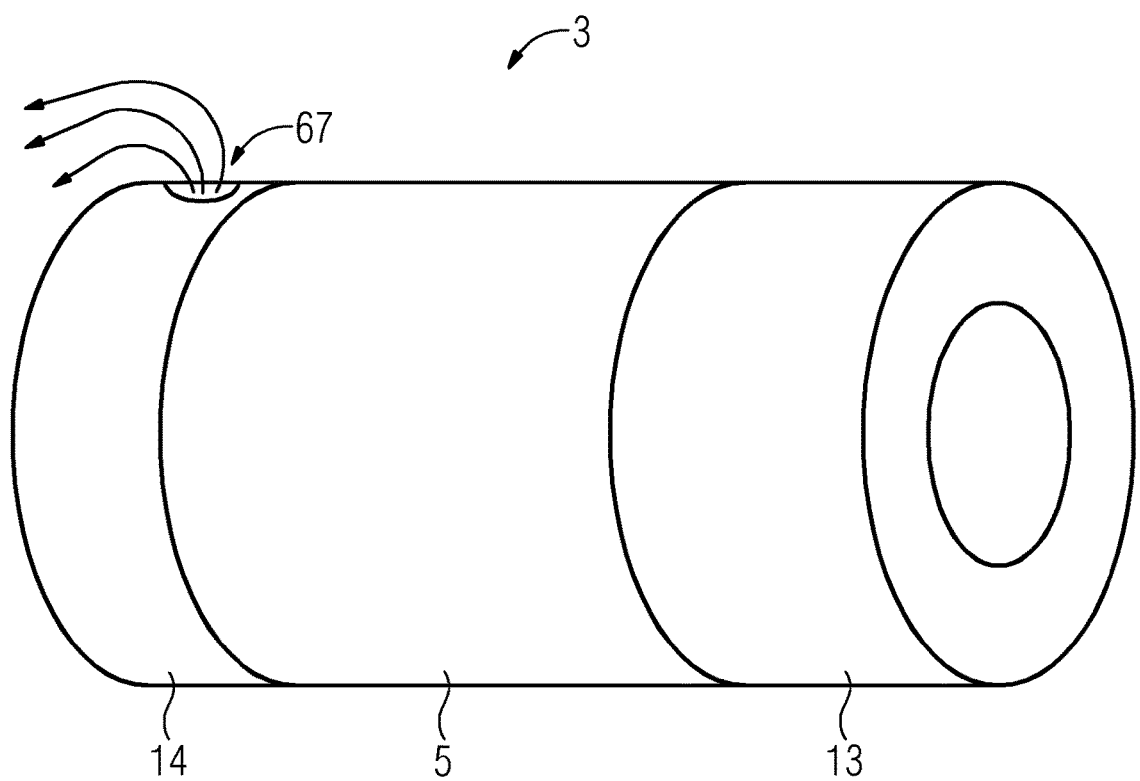
FIG. 9 shows a schematic perspective view of a stator incorporating teachings of the present disclosure.

FIG. 9 shows a schematic perspective view of a stator 3 according to a further embodiment of the teachings herein. This stator can be constructed similarly to the manner in the preceding examples in respect of the arrangement of the conductor segments within the slots of the stator laminated core. The shown first coolant chamber 13 in the first axial end region 15 of the stator can also be configured similarly to the manner described above. Therefore, this side of the stator is designed as a coolant inlet side here too, and the coolant is fed from the first coolant chamber 13, under pressure, into the ducts within the slots and thereby transported axially in the direction of the second axial end region 17, wherein the embedded stator winding is cooled.

However, in contrast to the previous examples, a second encapsulated coolant chamber 14 is present here in the second axial end region 17, which second encapsulated coolant chamber here collects the coolant emerging from the ducts of the slots and can return said coolant to the coolant circuit via an outlet opening 67. This encapsulated design of the outlet side can be advantageous, for example, in order to convey the coolant against the force of gravity on the outlet side and in so doing prevent a loss of coolant toward the rotor. Therefore, here, as illustrated in FIG. 9, the outlet opening 67 can be arranged at an upper end of the stator. Owing to the pressure of the coolant in the second coolant chamber 14, which pressure is elevated in relation to the surrounding area, it is possible to convey the coolant against the force of gravity here. In addition, apart from the exact positioning of the outlet opening, some embodiments include a encapsulation for the outlet side as shown, for example in order to be able to set a defined pressure difference across the ducts in the stator slots.

What is claimed is:

1. A stator for an electrical machine having a central axis, the stator comprising:
   a stator winding; and
   a stator yoke having a plurality of slots;
   wherein the stator winding includes a plurality of conductor segments connected to one another, wherein each conductor segment has one respective axially internal inner section, a first axially external outer section, and a second axially external outer section;
   wherein the respective inner section of each conductor segment is embedded into a respective slot and the respective outer sections of each conductor segment extend axially beyond the respective slots;
   wherein a duct for coolant flow in the axial direction is formed in one or more of the slots, the duct comprising a coolant pipe within which the respective inner section of one or more of the conductor segments is arranged;
   wherein the respective inner sections of a subset of the plurality of conductor segments comprise u-shaped conductors forming the coolant pipe between adjacent conductors;

wherein the stator defines, at least in a first axial end region, a first coolant chamber fluidically encapsulated from a surrounding area, wherein the first coolant chamber surrounds at least a portion of the respective first axially external outer section of each of the conductor segments situated in the first axial end region; and wherein the first coolant chamber is fluidically connected to the ducts to conduct coolant into and/or out of the ducts.

2. The stator as claimed in claim 1, wherein: the first coolant chamber, in the first axial end region, feeds coolant into the ducts; and an opposite second axial end region defines a coolant outlet side of the ducts.

3. The stator as claimed in claim 2, further comprising electrical connections for the stator winding to be connected to an outer electrical circuit, wherein the electrical connections are arranged exclusively in the second axial end region.

4. The stator as claimed in claim 1, further comprising, in a second axial end region opposite the first axial end region, a second coolant chamber fluidically encapsulated in relation to a surrounding area;

wherein the second coolant chamber surrounds at least a portion of the respective second axially external outer section of each of the conductor segments situated in the second axial end region.

5. The stator as claimed in claim 1, wherein: the stator yoke is connected, in the first axial end region, to a covering plate;

the first coolant chamber is sealed off in a fluid-tight manner in relation to the covering plate; and the covering plate defines a plurality of openings fluidically coupling the first coolant chamber to the ducts.

6. The stator as claimed in claim 1, wherein the stator winding includes, in the region of the inner sections, an impregnating agent fluidically sealing off the ducts in relation to an outer surrounding area.

7. The stator as claimed in claim 1, wherein:

the stator winding is formed by electrically connecting a plurality of prefabricated hairpin-shaped conductor elements; and each of the hairpin-shaped conductor elements includes two inner sections.

8. The stator as claimed in claim 1, wherein the stator winding is formed by electrically connecting a plurality of prefabricated rod-shaped and/or L-shaped conductor elements.

9. The stator as claimed in claim 1, further comprising:

at least one second duct defined by an intermediate space between the respective inner sections of the conductor segments extending in the axial direction.

10. The stator as claimed in claim 1, wherein:

for at least some of the conductor segments, the respective inner sections comprise hollow conductors; and one or more ducts are defined by interiors of the respective conductors.

11. The stator as claimed in claim 10, wherein, for at least some of the conductor segments, the inner sections comprise solid conductors.

12. The stator as claimed in claim 10, wherein the hollow conductors are electrically connected to one another by conductor sections in solid form.

13. The stator as claimed in claim 10, wherein:

some of the respective outer sections of the conductor segments comprise hollow conductors; and the hollow conductors include, in the region of the outer sections, openings to feed coolant into the hollow conductor and/or conduct coolant out of the hollow conductor.

14. An electrical machine comprising:

a rotor;

a stator winding; and a stator yoke having a plurality of slots;

wherein the stator winding includes a plurality of conductor segments connected to one another, wherein each conductor segment has one respective axially internal inner section, a first respective axially external outer section, and a second respective axially external outer section;

wherein the respective inner section of each conductor segment is embedded into a respective slot and the first respective outer section and the second respective outer section extend axially beyond the slot;

wherein a duct for coolant flow in the axial direction is formed in one or more of the slots, the duct comprising a coolant pipe within which the respective inner section of one or more of the conductor segments is arranged;

wherein the respective inner sections of a subset of the plurality of conductor segments comprise u-shaped conductors forming the coolant pipe between adjacent conductors;

wherein the stator defines, at least in a first axial end region, a first coolant chamber fluidically encapsulated from a surrounding area, wherein the first coolant chamber surrounds at least a portion of the respective first axially external outer section of each of the conductor segments situated in the first axial end region; and wherein the first coolant chamber is fluidically connected to the ducts to conduct coolant into and/or out of the ducts.

15. The electrical machine as claimed in claim 14, wherein there is no can.

* * * * *